United States Patent
Suzuki et al.

(10) Patent No.: US 9,851,680 B2
(45) Date of Patent: Dec. 26, 2017

(54) POWER SUPPLY DEVICE AND IMAGE FORMING APPARATUS INCLUDING POWER SUPPLY DEVICE

(71) Applicant: CANON KABUSHIKI KAISHA, Tokyo (JP)

(72) Inventors: Junji Suzuki, Hiratsuka (JP); Junichi Kubota, Higashiyamato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/183,621

(22) Filed: Jun. 15, 2016

(65) Prior Publication Data
US 2017/0003641 A1 Jan. 5, 2017

(30) Foreign Application Priority Data
Jun. 30, 2015 (JP) .................. 2015-132172

(51) Int. Cl.
*G03G 15/00* (2006.01)
*H02M 3/335* (2006.01)
*H02M 1/00* (2006.01)

(52) U.S. Cl.
CPC ........ *G03G 15/80* (2013.01); *H02M 3/33507* (2013.01); *H02M 3/33523* (2013.01); *H02M 2001/0006* (2013.01); *H02M 2001/008* (2013.01)

(58) Field of Classification Search
CPC .............. G03G 15/80; H02M 3/33507; H02M 3/33523; H02M 2001/0006; H02M 2001/008
See application file for complete search history.

(56) References Cited

U.S. PATENT DOCUMENTS

| 8,830,703 B2 | 9/2014 | Murofushi | |
|---|---|---|---|
| 2011/0163695 A1* | 7/2011 | Schmid | H02J 1/14 307/31 |
| 2011/0278927 A1* | 11/2011 | Phadke | H02M 3/285 307/31 |
| 2011/0293313 A1* | 12/2011 | Samejima | H02M 1/32 363/21.02 |

FOREIGN PATENT DOCUMENTS

| JP | 2000324815 A | | 11/2000 |
|---|---|---|---|
| JP | 2003054097 A | * | 2/2003 |
| JP | 2006311650 A | * | 11/2006 |

* cited by examiner

*Primary Examiner* — Jue Zhang
(74) *Attorney, Agent, or Firm* — Canon U.S.A., Inc. IP Division

(57) ABSTRACT

A power supply device includes first and second transformers, a first power source configured to output a first DC voltage from the first transformer, a second power source configured to output a second DC voltage from the second transformer, a first winding on a primary side of the first transformer, an auxiliary winding which is wound in the same winding direction as the first winding, and a voltage generator configured to be connected to the auxiliary winding and to generate a power supply voltage for driving a first controller of the first power source and a second controller of the second power source. When an AC voltage drops, control is performed such that the second controller stops prior to the first controller.

10 Claims, 10 Drawing Sheets

POWER SUPPLY DEVICE AND IMAGE FORMING APPARATUS INCLUDING POWER SUPPLY DEVICE

BACKGROUND OF THE INVENTION

Field of the Invention

The present invention relates to a power supply device that includes two transformers and outputs voltages obtained by converting an AC voltage of a commercial power source into different voltages by the two transformers.

Description of the Related Art

In general, for an electronic apparatus, a power supply device with a two-converter configuration which outputs voltages of two systems: a first DC voltage which is necessary for an operation of a central processing unit (CPU) or an integrated circuit (IC) (application specific integrated circuit (ASIC) etc.) for controlling an operation of the electronic apparatus; and a second DC voltage which is necessary for an operation of a motor, a solenoid, or the like, is used. Such a power supply device adopts a configuration which includes two electromagnetic transformers (hereinafter, referred to as transformers) for outputting corresponding DC voltages. The first DC voltage is about 3 V to about 5 V, and the second DC voltage is about 24 V. Accordingly, the second DC voltage is higher than the first DC voltage. The power supply device converts a DC voltage which is obtained by rectifying and smoothing an AC voltage of a commercial power source into the first DC voltage with a first switching power source (hereinafter, referred to as a control-system power source) which includes a first transformer, and outputs the first DC voltage. Meanwhile, the power supply device converts a DC voltage which is obtained by rectifying and smoothing the AC voltage of the commercial power source into the second DC voltage with a second switching power source (hereinafter, referred to as a driving-system power source) which includes a second transformer, and outputs the second DC voltage.

As such a power supply device, a power supply device which achieves power saving by stopping a driving-system power source to reduce power consumed by a driving system when an electronic apparatus is in a standby mode (power-saving mode), which is an energy-saving state, has been known (see Japanese Patent Laid-Open No. 2006-311650).

With the above-mentioned power supply device having the two-converter configuration, when a power outage occurs or a power supply cable is pulled out, the AC voltage of the commercial power source is interrupted, and the first DC voltage from the control power source to the control system drops, which may cause an unintended operation (false operation) as the electronic apparatus. For example, in the case where the AC voltage of the commercial power source drops while a motor is rotating, it is desirable that at least rotation of the motor stops before functions of a controller stop. However, if power to the controller drops (or stops) before power to the motor stops, power supply to the motor continues in a state in which the controller cannot properly control the motor, and the motor continues unintended rotation. Accordingly, in the case where a power outage occurs or a power supply cable is pulled out, it is necessary for the power supply device with the two-converter configuration to stop the driving-system power source prior to the control-system power source so that an unintended state can be avoided.

However, with the power supply device described in Japanese Patent Laid-Open No. 2006-311650, the control-system power source may stop prior to the driving-system power source, as described above. Operation of the power supply device described in Japanese Patent Laid-Open No. 2006-311650 is controlled by a control IC, and voltage needs to be supplied to drive the control IC. The power supply device will be described specifically with reference to FIG. 10. FIG. 10 illustrates a principal part of the power supply device. Reference numeral 101 denotes a control-system power source, and reference numeral 102 denotes a driving-system power source. Reference numeral 200 denotes a controller, and reference numeral 300 denotes a driving-system load. Reference numeral 103 denotes a smoothing capacitor for the control-system power source 101 and the driving-system power source 102. Reference numeral 107 denotes a control IC for controlling the control-system power source 101, and reference numeral 108 denotes a control IC for controlling the driving-system power source 102. Furthermore, an auxiliary winding 109c which is wound in a direction opposite the winding direction of a main winding 109p of a transformer 109 of the control-system power source 101 (hereinafter, referred to as flyback coupling) is provided. A voltage Vcc3, which is obtained by rectifying and smoothing a pulse voltage induced by the auxiliary winding 109c with a diode 110 and a capacitor 111, is used as a driving voltage of the control IC 107 and the control IC 108.

A voltage Vdd which is induced by the auxiliary winding 109c is substantially represented by expression (1), where, in FIG. 10, an output voltage of the control-system power source 101 is represented by Vout11, a forward voltage of a diode 112 is represented by Vfd, the number of windings of a secondary winding 109s is represented by Nss, and the number of windings of the auxiliary winding 109c is represented by Ndd.

$$V_{dd} \approx (V_{out11} + V_{fd}) \cdot \frac{N_{dd}}{N_{ss}} \quad (1)$$

The voltage Vdd is rectified and smoothed by the diode 110 and the capacitor 111, and is supplied as a power supply voltage Vcc3 of the control IC 107 and the control IC 108. The control IC 107 and the control IC 108 control a switching operation based on the power supply voltage Vcc3. At this time, in the case where the forward voltage of the diode 110 is represented by Vfd2, the power supply voltage Vcc3 is substantially represented by expression (2).

$$V_{cc3} \approx V_{dd} - V_{fd2} \approx (V_{out11} + V_{fd}) \cdot \frac{N_{dd}}{N_{ss}} - V_{fd2} \quad (2)$$

Accordingly, the rectified and smoothed power supply voltage Vcc3 is substantially proportional to the output voltage Vout11 of the control-system power source 101.

With the power supply device described in Japanese Patent Laid-Open No. 2006-311650, in the case where a power outage occurs or a power supply cable is pulled out while the electronic apparatus is operating, the power supply voltage Vcc3 of the control IC 108 does not drop before the output voltage Vout11 of the control-system power source 101 drops, as represented by expression (2). Only after the output voltage Vout11 of the control-system power source 101 drops, the power supply voltage Vcc3 of the control IC 108 of the driving-system power source 102 also drops. However, even when the power supply voltage Vcc3 drops, the control IC 108 does not quickly stop and is able to continue to operate. Therefore, the driving-system power source 102 maintains an output voltage Vout22. Accordingly, the output voltage Vout11 of the control-system power source 101 first drops, power supply to a motor continues while the driving-system power source 102 is outputting the output voltage Vout22 in a state in which the motor cannot be controlled properly, and the motor thus continues unintended rotation. Alternatively, an intended operation such as sudden motion of the motor may occur.

SUMMARY OF THE INVENTION

The present invention causes a driving-system power source to stop prior to a control-system power source in a case where an AC voltage of a commercial power source drops or stops while an electronic apparatus is operating so that a driving-system load does not perform an unintended operation.

A power supply device according to the present invention includes a first switching power source configured to include a first transformer to which a voltage obtained by rectifying and smoothing an input AC voltage is supplied and to output a first DC voltage by switching the first transformer; a first controller configured to control a switching operation of the first switching power source; a second switching power source configured to include a second transformer to which a voltage obtained by rectifying and smoothing the AC voltage is input and to output a second DC voltage by switching the second transformer; a second controller configured to control a switching operation of the second switching power source; a primary winding of the first transformer; an auxiliary winding which is wound in the same winding direction as the primary winding; and a voltage generator configured to be connected to the auxiliary winding and to generate a power supply voltage for driving the first controller and the second controller. When the AC voltage drops, the power supply device performs control such that the second controller stops prior to the first controller.

An image forming apparatus according to the present invention includes an image forming unit; and a power supply device configured to supply electric power to the image forming apparatus. The power supply device includes a first switching power source configured to include a first transformer to which a voltage obtained by rectifying and smoothing an input AC voltage is supplied and to output a first DC voltage by switching the first transformer, a first controller configured to control a switching operation of the first switching power source, a second switching power source configured to include a second transformer to which a voltage obtained by rectifying and smoothing the AC voltage is input and to output a second DC voltage by switching the second transformer, a second controller configured to control a switching operation of the second switching power source, a primary winding of the first transformer, an auxiliary winding which is wound in the same winding direction as the primary winding, and a voltage generator configured to be connected to the auxiliary winding and to generate a power supply voltage for driving the first controller and the second controller. When the AC voltage drops, the power supply device performs control such that the second controller stops prior to the first controller.

Further features of the present invention will become apparent from the following description of exemplary embodiments with reference to the attached drawings.

DESCRIPTION OF THE EMBODIMENTS

Hereinafter, embodiments of the present invention will be described in detail with reference to drawings. However, components described in the embodiments are merely exemplifications, and the scope of the present invention is not intended to be limited to the embodiments described below.
(Example of Apparatus to which Switching Power Source According to Embodiment is Applied)

A switching power source which will be described below in each of first to fifth embodiments may be adopted as, for example, a low-voltage power source of an image forming apparatus, that is, a power source for supplying power to a controller which controls an image forming operation and a driving unit such as a motor. First, a configuration of an image forming apparatus to which a switching power source according to each of the first to fifth embodiments is applied will be explained. A switching power source according to an embodiment may be applied not only to an image forming apparatus but also to any apparatus which includes a control-system load and a driving-system load.
[Configuration of Image Forming Apparatus]

Figure 9:
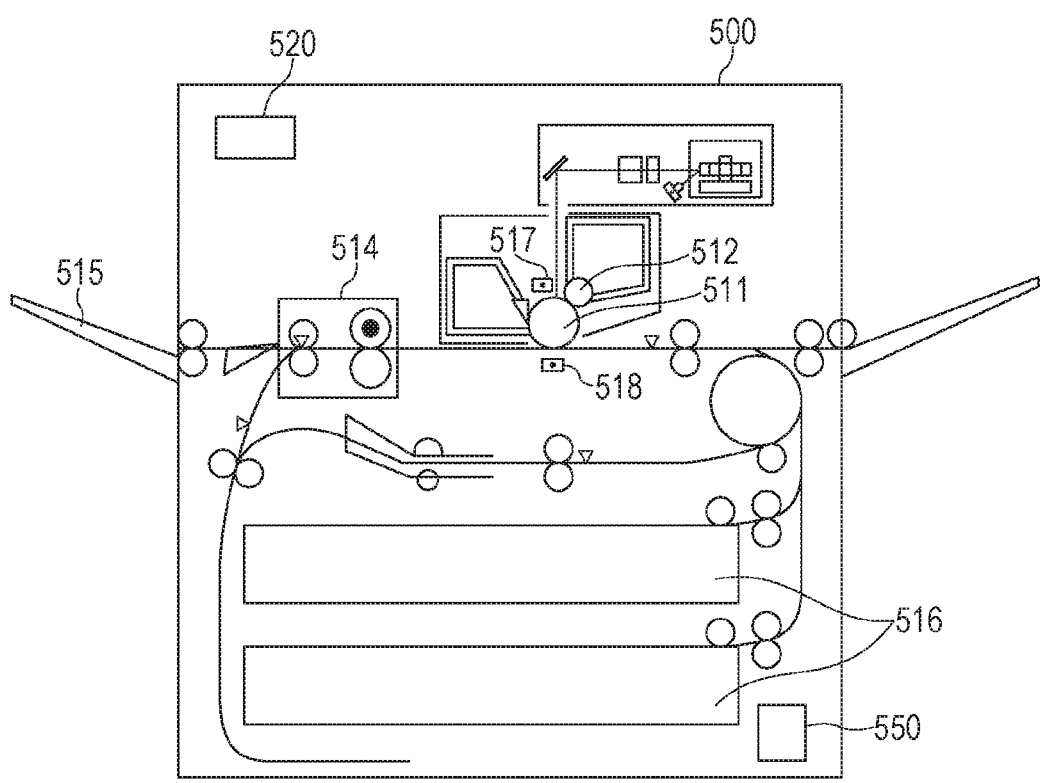
FIG. 9 is a diagram for explaining an application example of a power supply device.

As an example of an image forming apparatus, a schematic configuration of a laser beam printer as an example of an electrophotographic printer is illustrated in FIG. 9. A laser beam printer 500 includes a photosensitive drum 511 as an image carrying member on which an electrostatic latent image is formed. The laser beam printer 500 also includes a charging part 517 (charging unit) which uniformly charges the surface of the photosensitive drum 511, and a developing part 512 (developing unit) which develops the electrostatic latent image formed on the photosensitive drum 511 using toner. A toner image which has been developed on the photosensitive drum 511 is transferred by a transfer part 518

(transfer unit) to a sheet (not illustrated in FIG. 9) as a recording material which is supplied from a cassette 516, and the toner image which has been transferred to the sheet is fixed by a fixing device 514 and discharged to a tray 515. The photosensitive drum 511, the charging part 517, the developing part 512, and the transfer part 518 serve as an image forming unit. Furthermore, the laser beam printer 500 includes a power supply device 550, which will be explained below in the first to fifth embodiments. An image forming apparatus which may adopt the power supply device 550 according to the first to fifth embodiments is not limited to the configuration illustrated in FIG. 9, and for example, may be a color image forming apparatus which includes a plurality of image forming units capable of forming images of different colors. A color image forming apparatus may include, for example, a primary transfer part which transfers a toner image on the photosensitive drum 511 to an intermediate transfer belt, and a secondary transfer part which transfers the toner image on the intermediate transfer belt to a sheet.

The laser beam printer 500 includes a controller 520 which controls an image forming operation by the image forming unit and a conveyance operation for a sheet. For example, the power supply device 550 according to the first to fifth embodiments described below supplies power to the controller 520. Furthermore, the power supply device 550 according to the first to fifth embodiments supplies power to a driving unit such as a motor for rotating the photosensitive drum 511 or for driving various rollers for conveying a sheet.

First Embodiment

Figure 1:
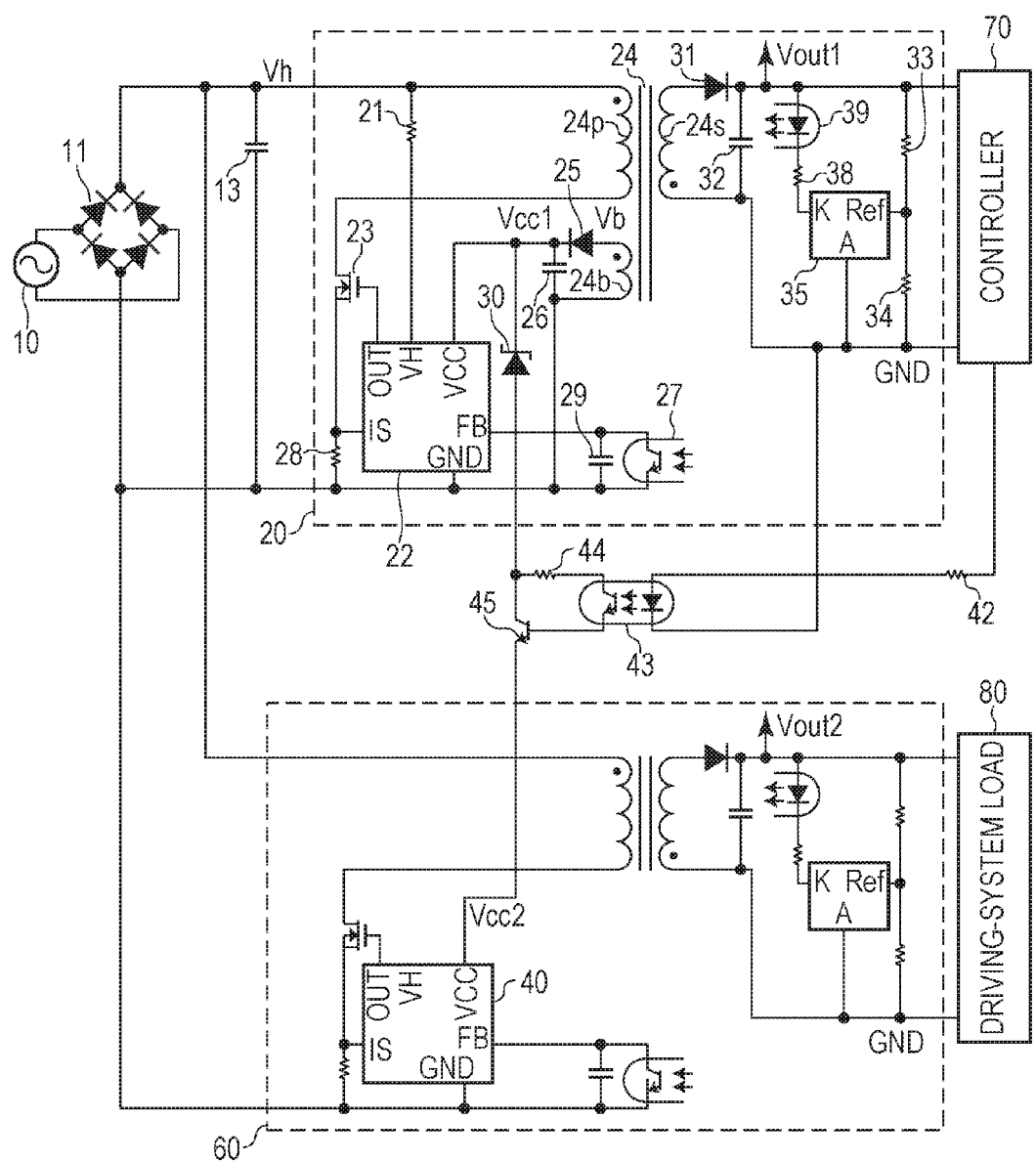
FIG. 1 is a circuit diagram illustrating a configuration of a power supply device according to a first embodiment.

FIG. 1 is a circuit diagram illustrating a configuration of a power supply device according to a first embodiment. This circuit has a two-converter configuration which supplies voltages of two systems, that is, a first DC voltage Vout1 to a control-system load which requires a low voltage for an operation of a CPU, an ASIC, or the like, and a second DC voltage Vout2 to a driving-system load which requires a high voltage for an operation of a motor, a solenoid, or the like.

In general, the first DC voltage Vout1 is set to be lower than the second DC voltage Vout2. For example, setting is generally performed such that Vout1 is set to DC 3.3 V and Vout2 is set to DC 24 V or such that Vout1 is set to DC 1.8 V and Vout2 is set to DC 12 V.

Hereinafter, explanation will be provided by way of example in which Vout1 is set to DC 3.3 V and Vout2 is set to DC 24 V. However, the above values of DC voltage are merely an example, and necessary voltages may be selected for various loads to which the voltages are applied.

Furthermore, an image forming apparatus according to the first embodiment includes a circuit (not illustrated in FIG. 1) configured to detect a drop of a commercial power source, and is able to detect a drop of an AC voltage caused by a power outage of the commercial power source or pulling out of a power supply cable. The circuit configured to detect a drop or stoppage of the AC voltage of the commercial power source may be, for example, a circuit (zero cross circuit) configured to detect a point at which the AC voltage crosses 0 V (referred to as a zero cross point). Alternatively, the circuit may be a circuit configured to detect the frequency of the AC voltage. The circuit configured to detect the frequency of the AC voltage is also used for controlling power applied to a fixing device in the image forming apparatus. The circuit configured to detect the frequency of the AC voltage is able to detect that a power outage occurs in the case where waveforms cannot be detected for a predetermined period of time. In the case where it is detected that a power outage has occurs, a controller for the CPU, the ASIC, or the like performs control such that predetermined termination processing is performed for the driving-system load for a motor and other circuits which are not illustrated in FIG. 1.

Referring to FIG. 1, reference numeral 20 denotes a first switching power source (hereinafter, referred to as a control-system power source) for supplying a DC voltage Vout1 to a control-system load, and reference numeral 60 denotes a second switching power source (hereinafter, referred to as a driving-system power source) for supplying a DC voltage Vout2 to a control-system load. Furthermore, reference numeral 70 denotes a load for the control-system power source 20, and is a controller for a controller, an ASIC, and the like for controlling an operation of the apparatus. Reference numeral 80 denotes a load (driving-system load) for the driving-system power source 60, and is a load for a motor, a solenoid, and the like for driving the apparatus. Furthermore, an auxiliary winding 24b, a diode 25, a capacitor 26, and a Zener diode 30 form a voltage generation circuit configured to generate a power supply voltage of a control IC according to the first embodiment.

First, an operation of the control-system power source 20 will be described. When an AC voltage is applied from a commercial power source 10, a voltage which is rectified by a rectifier 11 is charged to a capacitor 13. When charging to the capacitor 13 starts and the voltage across the terminals of the capacitor 13 increases, a power supply voltage is supplied to a VH terminal of a control IC 22, which is a first controller, via a starting resistor 21, and the control IC 22 turns on a field-effect terminal (FET) 23 through an OUT terminal and starts a switching operation. A transformer 24 is wound by a secondary winding 24s and the auxiliary winding 24b as well as a primary winding 24p. The secondary winding 24s is wound in a direction opposite the winding direction of the primary winding 24p. The auxiliary winding 24b is wound in the same direction as the winding direction of the primary winding 24p (hereinafter, referred to as forward coupling). When the FET 23 is turned on, a current flows from the capacitor 13 to the primary winding 24p of the transformer 24, and energy is stored by magnetic flux generated by the current. At this time, the voltage appearing at the secondary winding 24s is a voltage which allows an anode side of a diode 31 to be negative, and therefore no current flows. Furthermore, regarding the voltage appearing at the auxiliary winding 24b, a current flows in the direction in which the capacitor 26 is charged through the diode 25, and the voltage of the capacitor 26 increases. When the voltage of the capacitor 26 increases, the control IC 22 performs switching inside thereof such that the power supply voltage which has been supplied from the starting resistor 21 is changed to be supplied from the capacitor 26 which is connected to a VCC terminal. This switching processing is performed because a state in which the power supply voltage is consumed from the starting resistor 21 causes a large loss and the efficient is thus reduced. A voltage Vb which is induced by the auxiliary winding 24b is substantially represented by expression (3), where the voltage of the capacitor 13 is represented by Vh, the number of windings of the primary winding 24p is represented by Np, and the number of windings of the auxiliary winding 24b is represented by Nb.

$$V_b \approx V_h \cdot \frac{N_b}{N_p} \quad (3)$$

The voltage Vb is rectified and smoothed by the diode 25 and the capacitor 26, and is supplied as a power supply voltage Vcc1 to the control IC 22. Then, the control IC 22 continues to operate based on the power supply voltage Vcc1. The power supply voltage Vcc1 is substantially represented by expression (4), where the forward voltage of the diode 25 is represented by Vf.

$$V_{cc1} \approx V_b - V_f \approx V_h \cdot \frac{N_b}{N_p} - V_f \quad (4)$$

Accordingly the rectified and smoothed power supply voltage Vcc1 is substantially proportional to the voltage Vh of the capacitor 13.

The current flowing through the primary winding 24p of the transformer 24 is converted into a voltage by a resistor 28, and is supplied to an IS terminal of the control IC 22. The control IC 22 turns off the FET 23 at a time when the voltage input to the IS terminal reaches the voltage input to the FB terminal. Then, the voltage of a drain-side terminal of the FET 23 of the primary winding 24p increases. Furthermore, as the voltage appearing at the secondary winding 24s, a voltage which allows the anode side of the diode 31 to be positive appears, and the energy stored in the transformer 24 is discharged. Then, the current flows in the direction in which a capacitor 32 is discharged through the diode 31, and the voltage of the capacitor 32 increases. In the first embodiment, a control IC which performs pulse-width modulation (PWM) control is adopted, and the control IC 22 turns on the FET 23 so that an operation at a switching frequency corresponding to the FB terminal voltage can be achieved. When the FET 23 is turned on, a current flows again via the primary winding 24p of the transformer 24. The control IC 22 repeatedly turns on and off the FET 23 as described above, and the voltage of the capacitor 32 and the capacitor 26 gradually increases. The voltage of the capacitor 32 is equal to the output voltage Vout1 of the control-system power source 20.

A Ref terminal of a shunt regulator 35 is connected such that voltages obtained by dividing the output voltage Vout1 of the control-system power source 20 by resistors 33 and 34 are input. Furthermore, a cathode terminal of the shunt regulator 35 is connected to a light-emitting diode 39 of a photocoupler via a resistor 38, and a phototransistor 27 of the photocoupler is connected to the FB terminal of the control IC 22. The voltage of the FB terminal of the control IC 22 varies according to the current discharged by the control IC 22 and flowing through the FB terminal and an operation of a secondary-side feedback circuit and the phototransistor 27. When the output voltage of the control-system power source 20 drops, the output current of the shunt regulator 35 decreases. Therefore, the amount of light emission of the light-emitting diode 39 decreases, and the current flowing in the phototransistor 27 decreases. Therefore, a capacitor 29 is charged by the power source inside the control IC 22, and the voltage of the FB terminal thus increases. At this time, the control IC 22 turns off the FET 23 at a point in time when the voltage of the IS terminal reaches the voltage of the FB terminal. Therefore, the increase in the voltage of the FB terminal lengthens the ON time of the FET 23. In contrast, when the output voltage of the control-system power source 20 increases, the current flowing in the phototransistor 27 increases, electric charges at the capacitor 29 is discharged, and the voltage of the FB terminal thus drops. At this time, the control IC 22 turns off the FET 23 at a point in time when the voltage of the IS terminal reaches the voltage of the FB terminal. Therefore, the decrease in the voltage of the FB terminal shortens the ON time. As described above, the control IC 22 controls the ON time of the FET 23 such that a reference voltage Vref of the shunt regulator 35 is equal to voltages obtained by dividing the output voltage Vout1 of the control-system power source 20 by the resistors 33 and 34. Accordingly, a stable first DC voltage Vout1 is output as an output voltage.

Next, an operation of the driving-system power source 60 will be described. For the driving-system power source 60 according to the first embodiment, a control IC 40 which is the same as that used in the control-system power source 20 is used. Therefore, regarding the same functions and operations as those of the control-system power source 20, for example, reference signs and explanation for a configuration of a transformer, a photocoupler, and the like will be omitted.

Supply/stoppage of a voltage to a Vcc terminal of the control IC 40 of the driving-system power source 60 is controlled by the controller 70, and operation/stoppage of the control IC 40 is controlled. When an operation start signal is output by the controller 70, a current flows to a light-emitting diode of a photocoupler 43 via a resistor 42. Then, a phototransistor of the photocoupler 43 is turned on, a base current is supplied to a transistor 45 via a resistor 44, and the transistor 45 is turned on. Then, upon turning on of the transistor 45, the voltage Vcc1 of the control-system power source 20, which is represented by expression (4), is supplied as a power supply voltage Vcc2 of the control IC 40 via the Zener diode 30. At this time, the power supply voltage Vcc2 is substantially represented by expression (5), where the Zener voltage of the Zener diode 30 is represented by Vz.

$$V_{cc2} \approx V_{cc1} - V_z \approx V_h \cdot \frac{N_b}{N_p} - V_f - V_z \quad (5)$$

Accordingly, the rectified and smoothed voltage Vcc2 is substantially proportional to the voltage Vh of the capacitor 13.

As described above, there is a voltage difference Vz between the power supply voltage Vcc1 of the control IC 22 and the power supply voltage Vcc2 of the control IC 40, as represented by expressions (4) and (5), and the first embodiment is characterized in that the power supply voltage Vcc1 is higher than the power supply voltage Vcc2. When the voltage Vcc2 is supplied, the control IC 40 starts a switching operation. Then, by an operation similar to the control-system power source 20, a stable second DC voltage Vout2 is output as an output voltage.

Figure 2B:
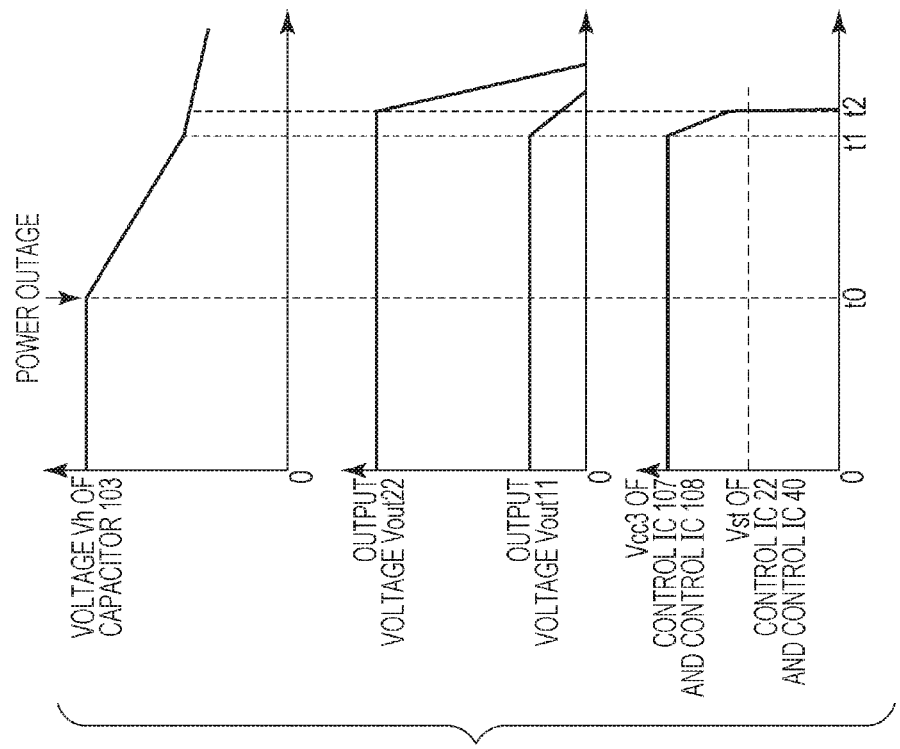
FIGS. 2A and 2B illustrate operating waveforms in a case where a power outage of the power supply device according to the first embodiment occurs or a power supply cable is pulled out.
Figure 2A:
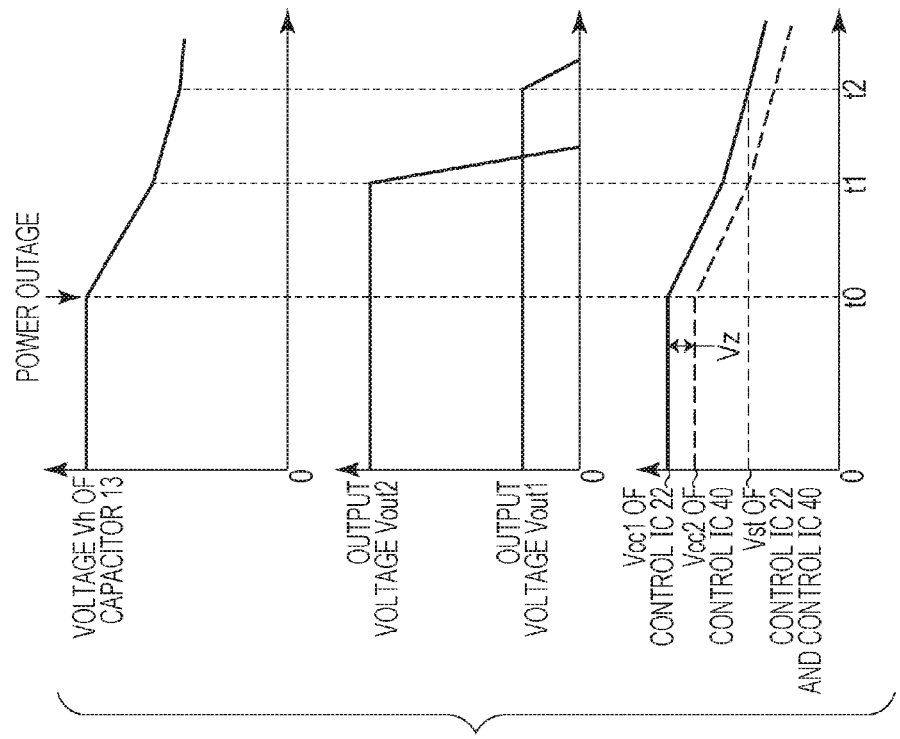
Figure 10:
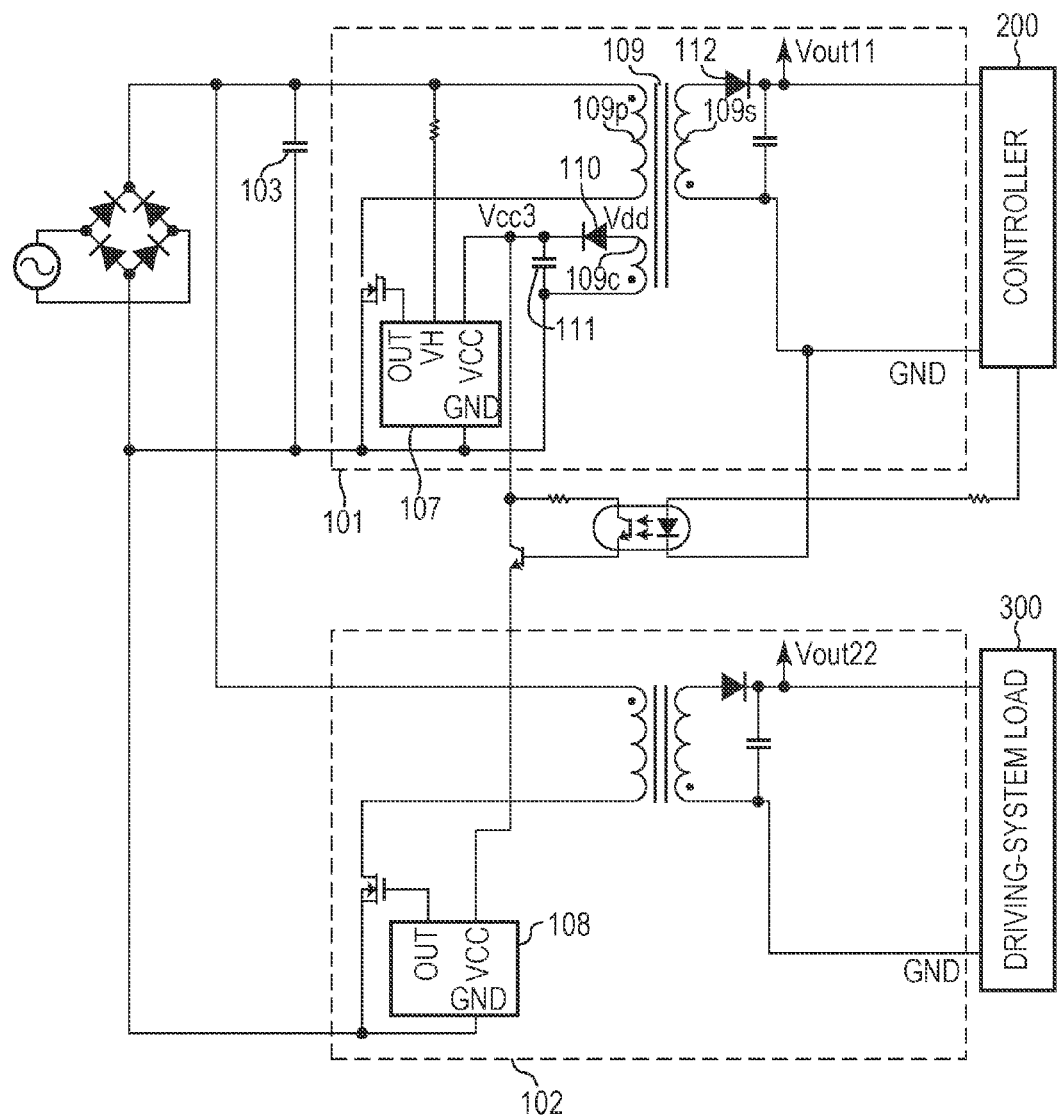
FIG. 10 is a circuit diagram illustrating a configuration of a power supply device according to a related art.

Next, transition of voltages, with the configuration according to the first embodiment, in the case where a steady state is shifted to a state in which a power outage occurs or a power supply cable is pulled out, will be described with reference to FIGS. 2A and 2B. In order to make a comparison between effects in the first embodiment and the related art, transition of voltages in the case where the auxiliary winding 109c is configured to achieve flyback coupling with respect to the primary winding 109p of the transformer 109 in the circuit of the power supply source described with reference to FIG. 10, will also be described.

First, transition of voltage waveforms and an operation of the power supply device when an AC voltage drops by occurrence of a power outage or pulling out of the plug in the case where the load of the driving-system load 80 in a standby state of the electronic apparatus according to the first embodiment is relatively small, will be described with reference to FIG. 2A. Before time t0, the voltage Vh of the capacitor 13 is stable in a state in which the AC voltage is supplied, and the control-system power source 20 and the driving-system power source 60 perform a normal operation. Therefore, the output voltages Vout1 and Vout2 change in a stable manner. For example, in the case where a power outage occurs at time t0, supply of the AC voltage from the commercial power source 10 stops, and therefore the voltage Vh of the capacitor 13 drops. At the same time, the power supply voltage Vcc1 of the control IC 22 and the power supply voltage Vcc2 of the control IC 40, which are substantially proportional to the voltage Vh as expressed by expressions (4) and (5), also start to drop. A voltage difference which corresponds to the Zener voltage Vz of the Zener diode 30 occurs between the power supply voltages Vcc1 and the Vcc2, as expressed by expression (5). Furthermore, during a period from time t0 to time t1, the control IC 22 and the control IC 40 may continue to perform control. Therefore, the control IC 22 and the control IC 40 continue to perform a switching operation and output the output voltages Vout1 and Vout2. The power supply voltage Vcc2 reaches an operation stoppage voltage Vst of the control IC 40 at time t1. Therefore, the driving-system power source 60 first stops, and the output voltage Vout2 starts to drop. Then, the power supply voltage Vcc1 reaches an operation stoppage voltage Vst of the control IC 22 at time t2. Therefore, the control-system power source 20 stops, and the output voltage Vout1 drops.

Next, transition of voltages in the case where a power outage occurs or a power supply cable is pulled out in a power supply device according to the related art will be described with reference to FIG. 2B. Before time t0, the voltage of the capacitor 103 is stable in a state in which the AC voltage is supplied, as in FIG. 2A, and the control-system power source 101 and the driving-system power source 102 perform a normal operation. Therefore, output voltages Vout11 and Vout22 change in a stable manner. For example, in the case where a power outage occurs at time t0, supply of the AC voltage from the commercial power source 10 stops, and the voltage of the capacitor 103 drops. Furthermore, during a period from time t0 to time t1, the control IC 107 and the control IC 108 may continue to perform control. Therefore, the control IC 107 and the control IC 108 continue to perform an operation and output the output voltages Vout11 and Vout22. During the period from time t0 to time t1, the power supply voltage Vcc3 of the control IC 107 and the control IC 108 is substantially proportional to the output voltage Vout11, as expressed by expression (2), and therefore the power supply voltage Vcc3 does not drop, unlike FIG. 2A. Then, the output voltage Vout11 cannot be maintained with power stored at the capacitor 103 at time t1, the output voltage Vout11 starts to drop, and the power supply voltage Vcc3 also stars to drop based on the substantially proportional relationship with the output voltage Vout11. Since the electronic apparatus is in the standby mode, the driving-system load 300 does not operate, and does not consume much power. Meanwhile, the control-system power source 101 supplies power to the controller 200, and therefore the output voltage Vout11 of the control-system power source 101 drops prior to the driving-system power source 102. When the power supply voltage of the controller 200 drops and the operation of the controller 200 stops at time t2, a driving signal of the driving-system power source 102 is not output. Therefore, the voltage Vcc3 of the control IC 108 is not supplied, the driving-system power source 102 stops, and the output voltage Vout22 drops. After time t2, the controller 200 is in an operation stoppage state, and the output voltage Vout22 exhibits a high level to some degree. In this state, the driving-system load 300 is able to operate, and there is a possibility in which an unintended operation such sudden motion of a motor, a solenoid, or the like occurs, as described above. In contrast, as described with reference to FIG. 2A, the power supply device according to the first embodiment is configured to allow the driving-system power source 60 to stop first, and when the operation of the controller 70 stops, a voltage supplied to the driving-system load 80 drops, and a motor or solenoid does not operate in an unintended manner.

As described above, in the case where a power outage occurs or a power supply cable is pulled out while the electronic apparatus is operating, the driving-system power source 60 may be caused to stop prior to the control-system power source 20. As a voltage generator in the first embodiment, a circuit which adopts a Zener diode for providing a potential difference between the power supply voltages Vcc1 and Vcc2 is provided. However, the present invention is not limited to this. For example, as a different configuration which provides a potential difference, a circuit may be configured such that the power supply voltage Vcc2 is generated from the power supply voltage Vcc1 by using a series regulator or a shunt regulator.

Second Embodiment

Regarding the switching power sources illustrated in FIG. 1 which are described in the first embodiment, supply of an AC voltage may be interrupted by a power outage or the like with a heavy load while the driving-system load 80 is operating. In this case, in order to drive the driving-system load 80, the driving-system power source 60 continues to supply power for a while by using electric energy stored in the capacitor 13. Then, the electric energy stored in the capacitor 13 is used by the driving-system power source 60, and the time to stoppage of the control-system power source 20 is therefore shortened. A second embodiment is characterized in that even in the case where a power outage occurs when the driving-system power source 60 has a heavy load, the time to stoppage of the control-system power source 20 is equivalent to the case where the driving-system power source 60 has a light load.

Figure 3:
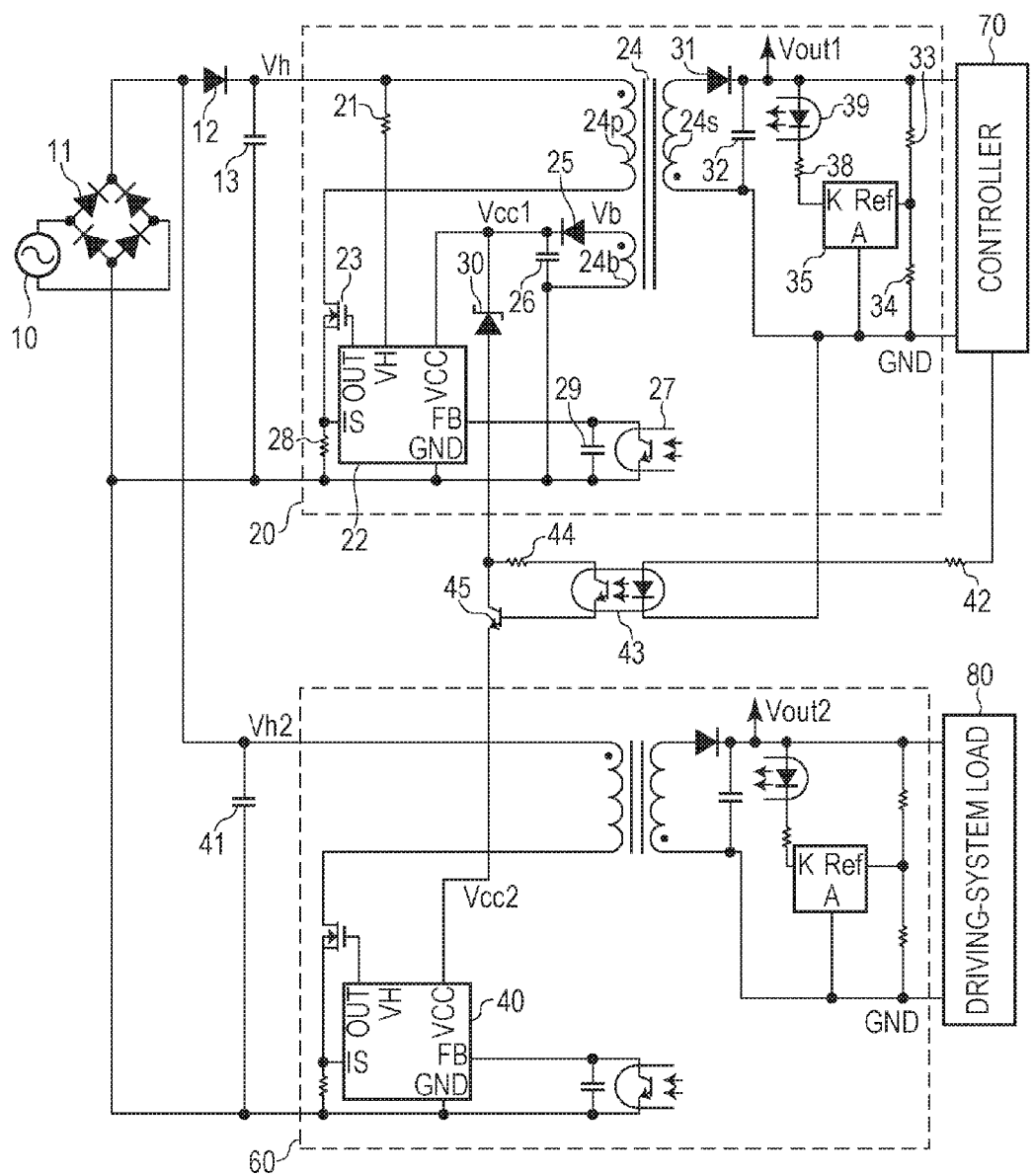
FIG. 3 is a circuit diagram illustrating a configuration of a power supply device according to a second embodiment.
Figure 4A:
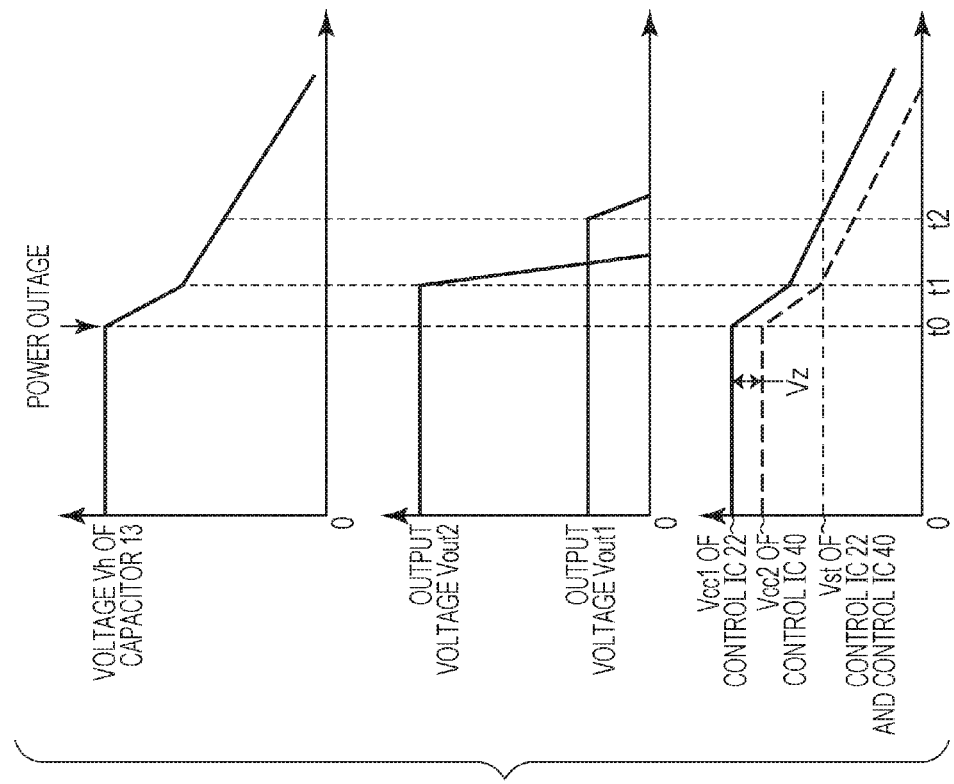
FIGS. 4A and 4B illustrate operating waveforms in a case where a power outage of the power supply device according to the second embodiment occurs or a power supply cable is pulled out.
Figure 4B:
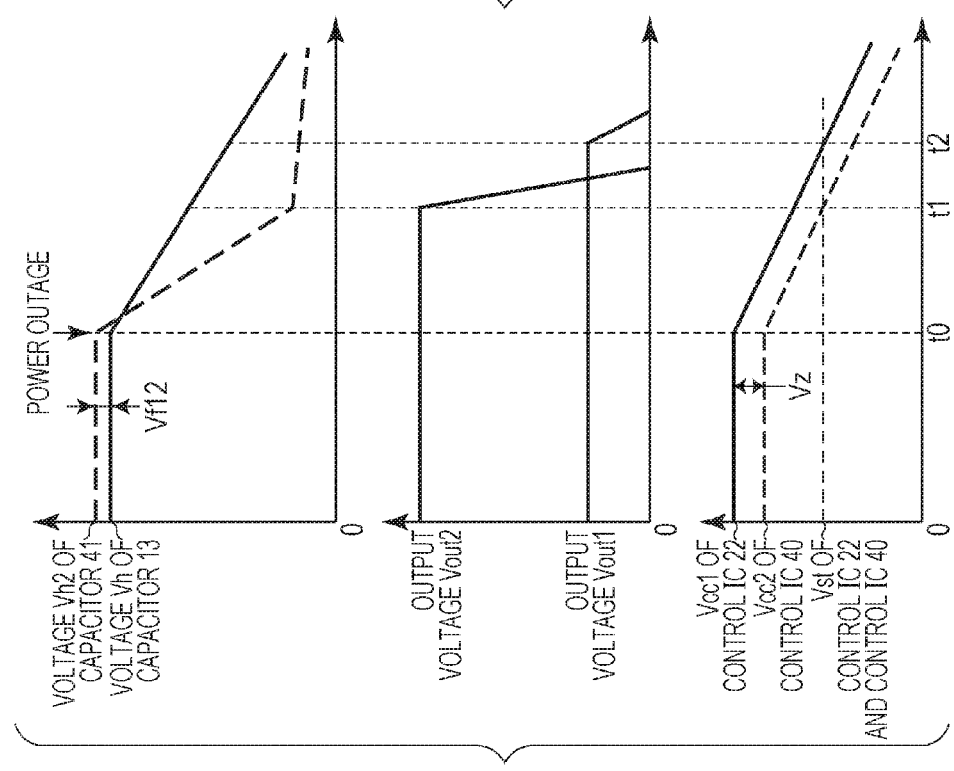

FIG. 3 illustrates a power supply device according to the second embodiment. Features of the configuration similar to those of the power supply device described above with reference to FIG. 1 will be referred to with the same reference signs, and explanation for those similar features will be omitted. FIGS. 4A and 4B illustrate operating waveforms which represent features of switching power sources according to the second embodiment. The configuration illustrated in FIG. 3 differs from the first embodiment (FIG. 1) in that a diode 12, which serves as a backflow prevention unit according to the second embodiment, and a capacitor 41 for the driving-system power source 60 are arranged in a rectification and smoothing circuit. That is, the second embodiment is characterized in that individual rectification and smoothing capacitors are arranged for the control-system power source 20 and the driving-system power source 60 so that electric energy stored in the capacitor 13 of the control-system power source 20 does not flow back to the capacitor 41 of the driving-system power source 60.

Referring to FIG. 3, when an AC voltage is applied from the commercial power source 10, the voltage which is rectified by the rectifier 11 is charged to the capacitor 13 via the diode 12. When the voltage across the terminals of the capacitor 13 increases, power is supplied to the VH terminal of the control IC 22 via the starting resistor 21, and the control IC 22 turns on the FET 23 through the OUT terminal and starts a switching operation. Then, in accordance with an operation similar to the first embodiment, the control-system power source 20 outputs a stable first DC voltage Vout1 as an output voltage.

Furthermore, when the AC voltage is applied from the commercial power source 10, the capacitor 41 is charged by the voltage which is rectified by the rectifier 11. When an operation start signal is output by the controller 70, the power supply voltage Vcc2 is supplied to the control IC 40, and the control IC 40 starts a switching operation. Then, in accordance with an operation similar to the control-system power source 20, the driving-system power source 60 outputs a stable second DC voltage Vout2 as an output voltage.

Next, an operation according to the second embodiment will be described with reference to FIGS. 4A and 4B. Explanation for parts similar to those in the first embodiment will be omitted. Transition of voltage waveforms and an operation of the power supply device in the case where a power outage occurs in the second embodiment will be described with reference to FIG. 4A. Before time t0, the voltage Vh of the capacitor 13 which is represented by a solid line and the voltage Vh2 of the capacitor 41 which is represented by a broken line are maintained stable, and the voltage Vh2 is expressed by equation (6), where the forward voltage of the diode 12 is represented by Vf12.

$$Vh2=Vh+Vf12 \quad (6)$$

When a power outage occurs at time t0, supply of electric charges from the commercial power source stops, and the voltage Vh of the capacitor 13 and the voltage Vh2 of the capacitor 41 start to drop. In the case where the driving-system power source 60 has a heavy load, a large amount of electric energy stored in the capacitor 41 is discharged to the driving-system load 80, and electric energy is not supplied from the commercial power source. Therefore, the voltage Vh2 of the capacitor 41 sharply drops, as expressed by the broken line of FIG. 3A. Meanwhile, electric energy does not flow back to the capacitor 41 by the diode 12, and therefore the voltage Vh of the capacitor 13 drops gradually as expressed by the solid line, instead of dropping sharply. Then, in accordance with the drop of the voltage Vh, the voltage Vcc1 of the control IC 22 and the voltage Vcc2 of the control IC 40, which are substantially proportional to the voltage Vh, as represented by expressions (4) and (5), start to drop. Furthermore, during the period from t0 to t1, the control IC 22 and the control IC 40 are able to continue to perform control, and therefore continue to operate and output the output voltages Vout1 and Vout2. When the voltage Vcc2 reaches the operation stoppage voltage Vst of the control IC 40 at time t1, the driving-system power source 60 first stops, and the output voltage Vout2 starts to drop. After that, when the voltage Vcc1 reaches the operation stoppage voltage Vst of the control IC 22 at time t2, the control-system power source 20 stops, and the output voltage Vout1 drops. In the second embodiment, with the diode 12 for backflow prevention, the gradient of decrease in the voltage Vh of the capacitor 13 is substantially constant irrespective of whether the driving-system power source 60 has a heavy load or a light load. Therefore, the time t2, which is the time from the occurrence of the power outage to stoppage of the control IC 22, is substantially constant irrespective of the state of the driving-system load 80 of the driving-system power source 60.

Next, in order to explain effects of the second embodiment, a comparison with operating waveforms in the case where the driving-system power source 60 has a heavy load in the configuration according to the first embodiment will be made with reference to FIG. 4B. Before time t0, the voltage Vh of the capacitor 13 is maintained stable, as in the first embodiment, and the control-system power source 20 and the driving-system power source 60 perform a normal operation. Therefore, the output voltages Vout1 and Vout2 change in a stable manner. When a power outage occurs at time t0, in the case where the driving-system power source 60 has a heavy load, a large amount of electric energy stored in the capacitor 13 is discharged to the driving-system load 80, and electric energy is not supplied from the commercial power source. Therefore, the voltage Vh drops sharply, as illustrated in FIG. 4B. In accordance with the drop of the voltage Vh, the voltage Vcc1 of the control IC 22 an the voltage Vcc2 of the control IC 40, which are substantially proportional to the voltage Vh, drop. When the voltage Vcc2 reaches the operation stoppage voltage Vst of the control IC 40 at time t1, the driving-system power source 60 first stops, and the output voltage Vout2 drops. Then, when the voltage Vcc1 reaches the operation stoppage voltage Vst of the control IC 22 at time t2, the control-system power source 20 stops, and the output voltage Vout1 drops. Accordingly, in the case where the driving-system power source 60 has a heavy load, the voltage Vh of the capacitor 13 drops sharply due to power supply to the driving-system load after the occurrence of the power outage. Therefore, time t1, which is a time from time t0 at which the power outage occurs to the time at which the control IC 40 reaches the operation stoppage voltage, is shorter than the case illustrated in FIG. 4A. Accordingly, time t2, at which the operation stoppage voltage Vst of the control IC 22 is reached and the output voltage Vout11 drops, is also shortened.

As described above, according to the second embodiment, irrespective of the load state of the driving-system power source 60, the time to completion of predetermined processing by the control-system power source 20 when a power outage occurs or a power supply cable is pulled out while the electronic apparatus is operating may be secured. Therefore, with the circuit configured to detect a drop of the commercial power source, which is not illustrated in FIG. 3, even while the driving-system load 80 of the driving-system power source 60 is operating, operation termination processing for the driving-system load 80 may be completed before functions of the controller 70 stop.

Third Embodiment

Figure 5:
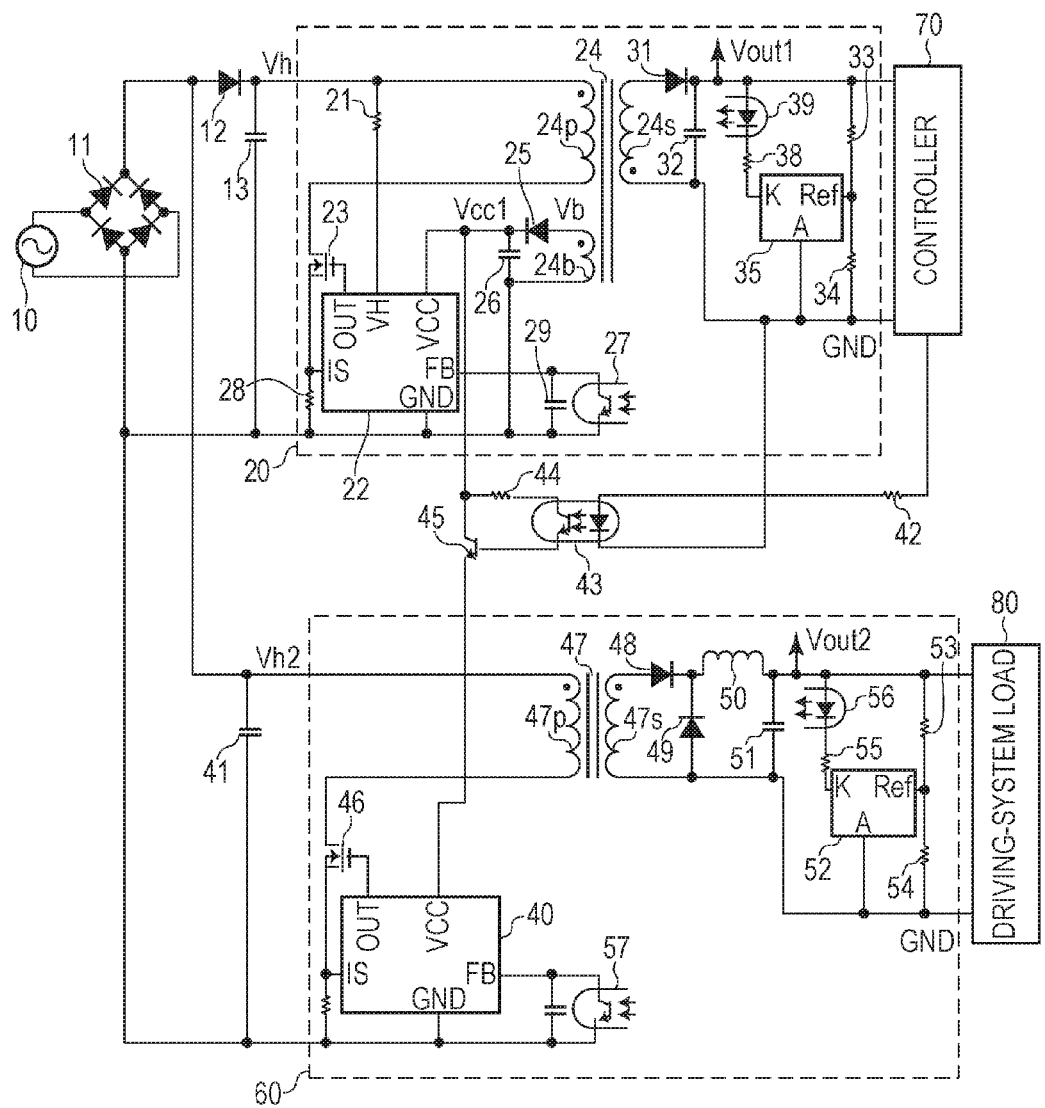
FIG. 5 is a circuit diagram illustrating a configuration of a power supply device according to a third embodiment.
Figure 6:
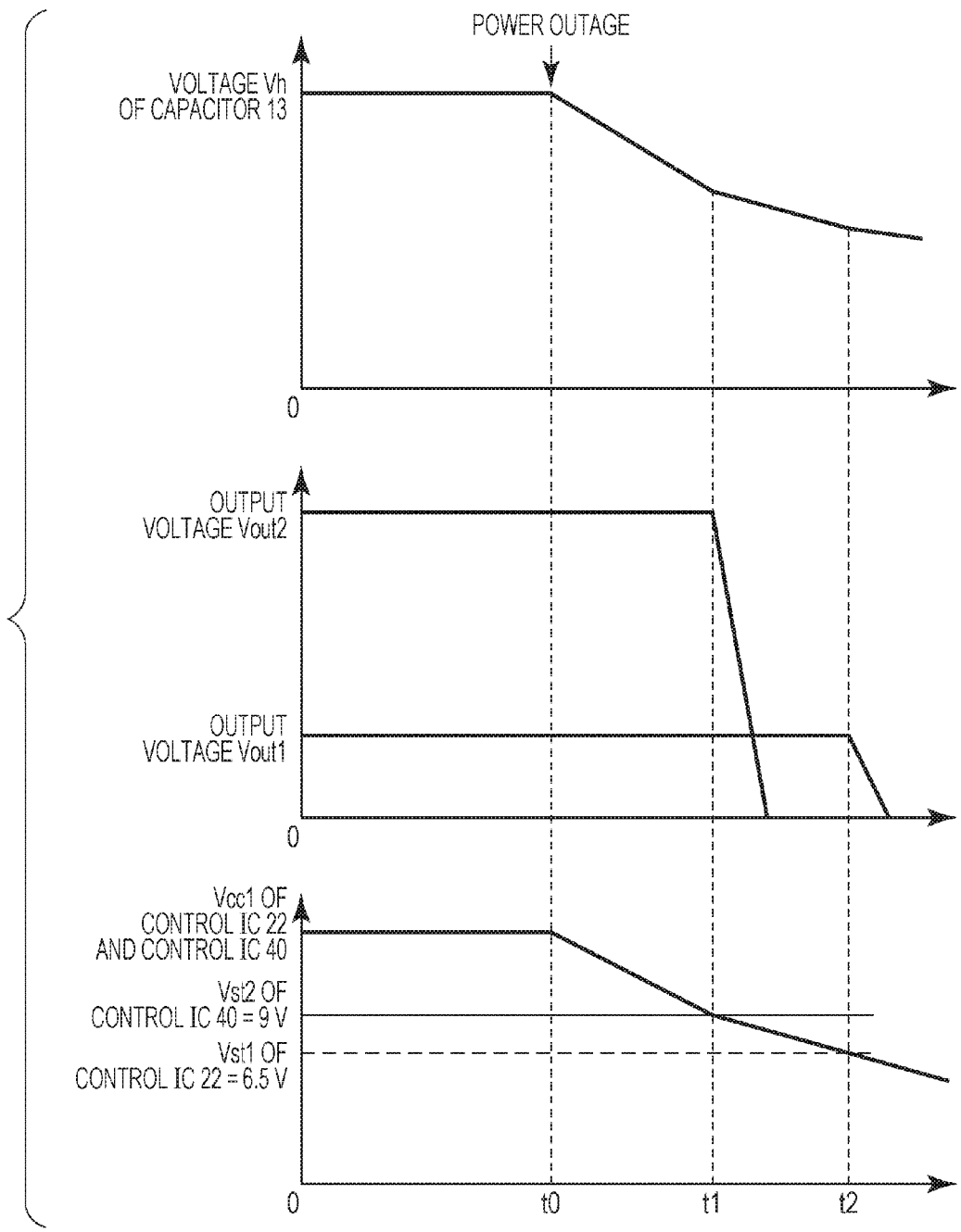
FIG. 6 illustrates operating waveforms in a case where a power outage of the power supply device according to the third embodiment occurs or a power supply cable is pulled out.

FIG. 5 illustrates a power supply device according to a third embodiment. Features of the configuration similar to those of the power supply devices described above with reference to FIGS. 1 and 3 will be referred to with the same reference signs, and explanation for those similar features will be omitted. FIG. 6 illustrates operating waveforms which represent features of switching power sources according to the third embodiment.

In the third embodiment, the control IC 22 of the control-system power source 20 and the control IC 40 of the driving-system power source 60 illustrated in FIG. 5 have different operation stoppage voltages. Specifically, the operation stoppage voltage of the control IC 22, which is represented by Vst1, is 6.5 V, and the operation stoppage voltage of the control IC 40, which is represented by Vst2, is 9 V. As described above, the third embodiment is characterized by a combination of control ICs which have a relationship of Vst1<Vst2. Furthermore, the third embodiment differs from the second embodiment (FIG. 3) in that the Zener diode 30 is not provided in the third embodiment. Therefore, the voltage Vcc1 supplied to the control IC 22 of the control-system power source 20 and the voltage Vcc1 supplied to the control IC 40 of the driving-system power source 60 are substantially the same.

First, an operation of the control-system power source 20 will be described. When an AC voltage is applied from the commercial power source 10, the voltage which is rectified by the rectifier 11 is charged to the capacitor 13 via the diode 12. When the voltage across the terminals of the capacitor 13 increases, power is supplied to the VH terminal of the control IC 22 via the starting resistor 21. The control IC 22 turns on the FET 23 through the OUT terminal, and starts a switching operation. Then, by an operation similar to the first embodiment, the control-system power source 20 outputs a stable first DC voltage Vout1 as an output voltage.

Next, an operation of the driving-system power source 60 will be described. In the third embodiment, the driving-system power source 60 is a forward switching power source. When an AC voltage is applied from the sheet supply apparatus 10, the capacitor 41 is charged by the voltage which is rectified by the rectifier 11. When an operation start signal is output by the controller 70, the power supply voltage Vcc1 is supplied to the control IC 40. The control IC 40 turns on an FET 46, and starts a switching operation. A transformer 47 is wound by a secondary winding 47s as well as a primary winding 47p. The secondary winding 47s is wound in the same direction as the winding direction of the primary winding 47p. A pulse voltage which is generated by the secondary winding 47s of the transformer 47 is rectified and smoothed by a forward rectification and smoothing circuit which includes diodes 48 and 49, a choke winding 50, and a capacitor 51, and a DC voltage Vout2 is obtained. Voltages which are obtained by dividing the output voltage Vout2 of the driving-system power source 60 by resistors 53 and 54 are connected to a Ref terminal of a shunt regulator 52 so that the output voltage Vout2 exhibits a desired value. Then, a cathode terminal of the shunt regulator 52 is connected to a light-emitting diode 56 of a photocoupler via a resistor 55, and a phototransistor 57 of the photocoupler is connected to the FB terminal of the control IC 40. The voltage of the FB terminal of the control IC 40 varies according to the current at the FB terminal which is discharged by the control IC 40 and an operation of a secondary-side feedback circuit and the phototransistor 57. The variations in the FB voltage serve as a main trigger for the switching duty of the FET 46 and a change in the switching frequency. Accordingly, control for a stable output voltage Vout2 can be achieved.

Next, an operation according to the third embodiment will be described with reference to FIG. 6. Explanation for parts similar to those in the first embodiment will be omitted. First, transition of voltage waveforms and an operation of the power supply device in the case where a power outage occurs in the third embodiment will be described with reference to FIG. 6. Before time t0, the voltage Vh of the capacitor 13 which is represented by a solid line in FIG. 6 is maintained stable, and the control-system power source 20 and the driving-system power source 60 perform a normal operation. Therefore, the output voltages Vout1 and Vout2 change in a stable manner. When a power outage occurs at time t0, supply of electric charges from the commercial power source stops, and the voltage Vh of the capacitor 13 drops. At the same time, the voltages Vcc1 of the control IC 22 and the control IC 40, which are substantially proportional to the voltage Vh, as represented by expression (4), start to drop. Furthermore, during the time from time t0 to time t1, the control IC 22 and the control IC 40 are able to continue to perform control, and therefore continue to operate and output the output voltages Vout1 and Vout2. When the voltage Vcc1 reaches the operation stoppage voltage Vst2=9 V of the control IC 40 at time t1, the driving-system power source 60 stops first, and the output voltage Vout2 starts to drop. Then, when the voltage Vcc1 reaches the operation stoppage voltage Vst1=6.5 V of the control IC 22 at time t2, the control-system power source 20 stops, and the output voltage Vout1 drops.

As described above, by adopting control ICs having different operation stoppage voltages, even if the Zener diode in the second embodiment is removed, the driving-system power source 60 may be stopped prior to the control-system power source 20 in the case where a power outage occurs or a power supply cable is pulled out while the electronic apparatus is operating. In the third embodiment, the control IC 22 and the control IC 40 are explained by way of example. However, the present invention is not limited to this. The same effects may be attained with a combination in which the operation stoppage voltage Vst1 is lower than the operation stoppage voltage Vst2.

Fourth Embodiment

Figure 7:
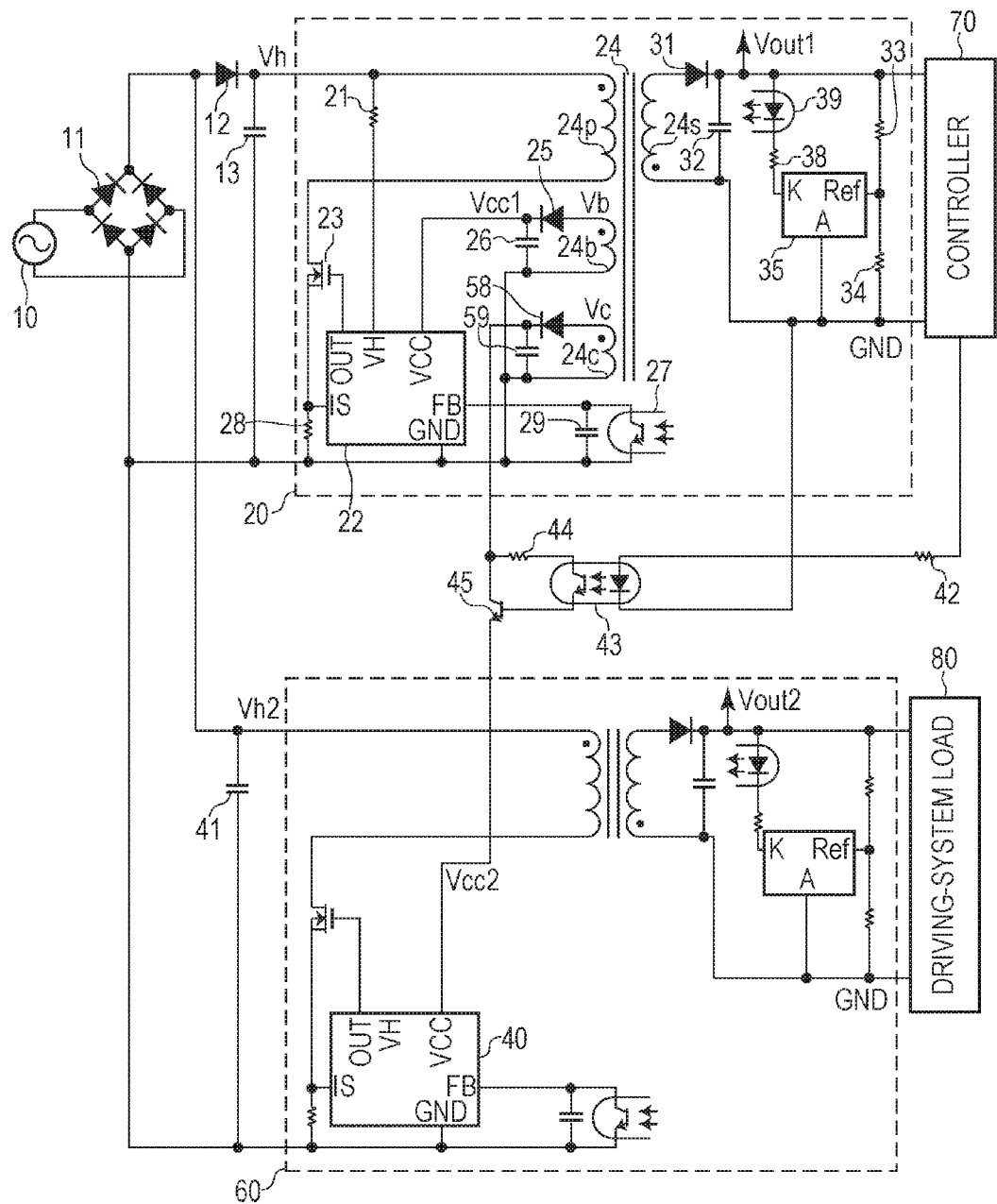
FIG. 7 is a circuit diagram illustrating a configuration of a power supply device according to a fourth embodiment.

FIG. 7 illustrates a power supply device according to a fourth embodiment. Features of the configuration similar to those of the power supply devices described above with reference to FIGS. 1 and 3 will be referred to with the same reference signs, and explanation for those similar features will be omitted. Referring to FIG. 7, the auxiliary winding 24b, the diode 25, the capacitor 26, an auxiliary winding 24c, a diode 58, and a capacitor 59 form a voltage generator according to the fourth embodiment for generating power supply. The fourth embodiment differs from the second embodiment (FIG. 3) in that the power supply voltage Vcc2 of the control IC 40 of the driving-system power source 60 is supplied from the auxiliary winding 24c, which is provided in the fourth embodiment, and the Zener diode 30 is removed.

First, an operation of the control-system power source 20 will be described. When an AC voltage is applied from the commercial power source 10, the voltage which is rectified by the rectifier 11 is charged to the capacitor 13 via the diode 12. When the voltage across the terminals of the capacitor 13 increases, power is supplied to the VH terminal of the control IC 22 via the starting resistor 21. The control IC 22 turns on the FET 23 through the OUT terminal, and starts a switching operation. The transformer 24 is wound by the secondary winding 24s, the auxiliary winding 24b, and the auxiliary winding 24c as well as the primary winding 24p. The secondary winding 24s is wound in a direction opposite the winding direction of the primary winding 24p. The auxiliary winding 24b is wound in the same direction as the winding direction of the primary winding 24p (hereinafter, referred to as forward coupling). Furthermore, like the auxiliary winding 24b, the auxiliary winding 24c achieves forward coupling with respect to the primary winding 24p.

When the FET 23 is turned on, a current flows from the capacitor 13 to the primary winding 24p of the transformer 24, and energy is stored by magnetic flux generated by the current. At this time, the voltage appearing at the secondary winding 24s is a voltage which allows the anode side of the diode 31 to be negative, and therefore no current flows. Furthermore, regarding the voltage appearing at the auxiliary winding 24b, a current flows in the direction in which the capacitor 26 is charged through the diode 25, and the voltage of the capacitor 26 increases. Furthermore, regarding the voltage appearing at the auxiliary winding 24c, a current flows in the direction in which the capacitor 59 is charged through the diode 58, and the voltage of the capacitor 59 increases.

The voltage Vcc1 of the Vcc terminal of the control IC 22 is represented by expression (4), which is described above in the first embodiment. The voltage Vc which is induced by the auxiliary winding 24c is substantially represented by expression (7), where the number of windings of the auxiliary winding 24c is represented by Nc.

$$V_c \approx V_h \cdot \frac{N_c}{N_p} \quad (7)$$

The voltage Vc is rectified and smoothed by the diode 58 and the capacitor 59, and is supplied as the power supply voltage Vcc2 to the control IC 40. The voltage Vcc2 is substantially represented by expression (8), where the forward voltage of the diode 58 is represented by Vf58.

$$V_{cc2} \approx V_c - V_{f58} \approx V_h \cdot \frac{N_c}{N_p} - V_{f58} \quad (8)$$

Therefore, like the voltage Vcc1, the rectified and smoothed voltage Vcc2 is also substantially proportional to the voltage Vh of the capacitor 13. Then, by an operation as in the second embodiment, the control-system power source 20 outputs a stable first DC voltage Vout1 as an output voltage.

Next, an operation of the driving-system power source 60 will be described. The driving-system power source 60 according to the fourth embodiment uses the same control IC 40 as that in the control-system power source 20. Therefore, the same functions and operations as those of the control-system power source 20 will not be referred to with reference signs, and explanation for those functions and operations will be omitted. The voltage supply state to the Vcc terminal of the control IC 40 of the driving-system power source 60 is controlled by the controller 70, and operation/stoppage of the control IC 40 may thus be controlled.

When an operation start signal is output by the controller 70, a current flows to a light-emitting diode of the photocoupler 43 via the resistor 42. Then, the phototransistor is turned on, a base current to the transistor 45 is supplied via the resistor 44, and the transistor 45 is turned on. The collector of the transistor 45 is connected to a line of the power supply voltage Vcc2 which is represented by expression (8) of the control-system power source 20, and when the power supply voltage Vcc2 is supplied, the control IC 40 starts a switching operation. Then, by an operation similar to the control-system power source 20, a stable second DC voltage Vout2 is output as an output voltage.

The number of windings of the auxiliary winding 24b and the number of windings of the auxiliary winding 24c of the transformer 24 have a relationship represented by expression (9).

$$Nb > Nc \quad (9)$$

Therefore, in accordance with expressions (4), (8), and (9), the power supply voltage Vcc1 of the control IC 22 and the power supply voltage Vcc2 of the control IC 40 may have the size relationship of Vcc1>Vcc2. Operating waveforms in the case where a power outage occurs or a power supply cable is pulled out are similar to those described in the second embodiment with reference to FIG. 4A. Therefore, explanation for the operating waveforms will be omitted.

As described above, in the case where a power outage occurs or a power supply cable is pulled out while the electronic apparatus is operating, the driving-system power source 60 may be stopped prior to the control-system power source 20. Furthermore, by providing separate auxiliary windings, the influence of variations in the voltage caused by an operation of a different control IC is not received, and a more stable power supply line may be achieved.

Fifth Embodiment

Figure 8:
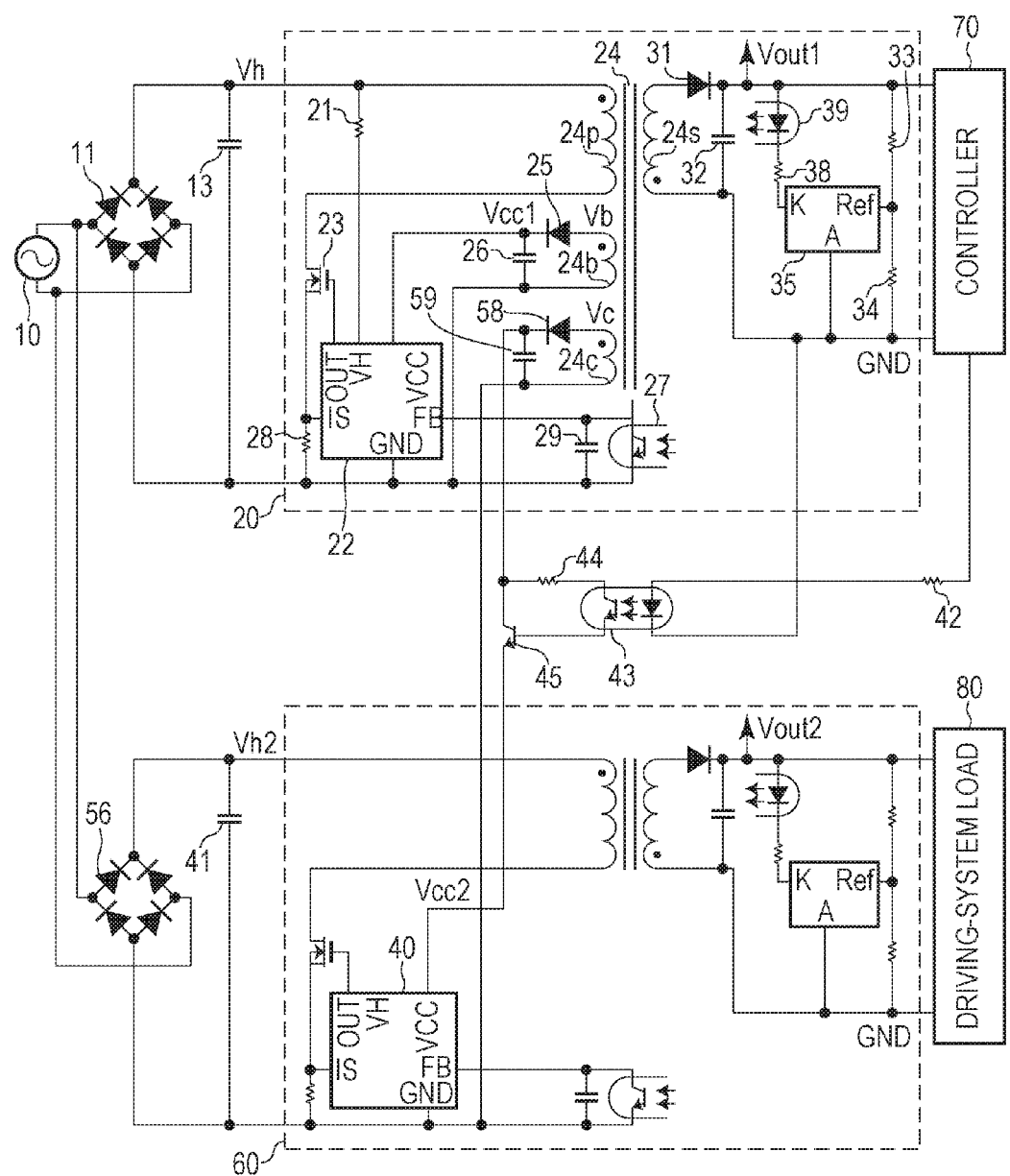
FIG. 8 is a circuit diagram illustrating a configuration of a power supply device according to a fifth embodiment.

FIG. 8 illustrates a power supply device according to a fifth embodiment. Features of the configuration similar to those of the power supply device described above with reference to FIG. 1 and FIGS. 2A and 2B will be referred to with the same reference signs, and explanation for those similar features will be omitted. In the fifth embodiment, the case where the load capacity of the driving-system load 80 is large and two rectifiers are separately provided, will be described.

In the configuration illustrated in FIG. 8, in a rectification and smoothing circuit, a rectifier 56 is provided instead of the diode 12, which is a backflow prevention unit. In the case of the circuit configuration illustrated in FIG. 8, the rectifier 11 and the rectifier 56 are separately provided. Thus, the potential on a low level side is different between the capacitor 13 and the capacitor 41 after rectification, and there is a concern in which there is a difference between the GND potential of the control IC 22 and the GND potential of the control IC 40. Therefore, as illustrated in FIG. 8, a terminal that is opposite the terminal connected to the diode 58 of the auxiliary winding 24c is connected to the GND terminal of the control IC 40. Accordingly, the pulse voltage output from the auxiliary winding 24c is based on the GND of the control IC 40, and a stable starting voltage Vcc2 may be supplied.

First, an operation of the control-system power source 20 will be described. When an AC voltage is applied from the commercial power source 10, the voltage which is rectified by the rectifier 11 is charged to the capacitor 13. When the voltage across the terminals of the capacitor 13 increases, power is supplied to the VH terminal of the control IC 22 via the starting resistor 21. The control IC 22 turns on the FET 23 through the OUT terminal, and starts a switching operation. Then, by an operation similar to the fourth embodiment, the control-system power source 20 outputs a stable first DC voltage Vout1 as an output voltage.

Next, an operation of the driving-system power source 60 will be described. When an AC voltage is applied from the commercial power source 10, the capacitor 41 is charged by the voltage which is rectified by the rectifier 56. When an operation start signal is output by the controller 70, the power supply voltage Vcc2 is supplied to the control IC 40, and the control IC 40 starts a switching operation. Then, by an operation similar to the control-system power source 20, the driving-system power source 60 outputs a stable second DC voltage Vout2 as an output voltage.

Operating waveforms in the case where a power outage occurs or a power supply cable is pulled out are similar to those described above in the second embodiment with reference to FIG. 4A. Therefore, explanation for the operating waveforms will be omitted. As described above, the driving-system power source 60 may be stopped prior to the control-system power source 20 in the case where a power outage occurs or a power supply cable is pulled out while the electronic apparatus is operating.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132172 filed Jun. 30, 2015, which is hereby incorporated by reference herein in its entirety.

What is claimed is:

1. A power supply device comprising:
a first switching power source configured to include a first transformer to which a voltage obtained by rectifying and smoothing an input AC voltage is supplied and to output a first DC voltage by switching the first transformer;
a first controller configured to control a switching operation of the first switching power source;
a second switching power source configured to include a second transformer to which a voltage obtained by rectifying and smoothing the AC voltage is input and to output a second DC voltage by switching the second transformer;
a second controller configured to control a switching operation of the second switching power source;
a primary winding of the first transformer;
an auxiliary winding which is wound in the same winding direction as the primary winding; and
a voltage generator configured to be connected to the auxiliary winding and to generate a power supply voltage for driving the first controller and the second controller,
wherein the voltage generator generates the power supply voltage such that a power supply voltage supplied to the second controller is lower than a power supply voltage supplied to the first controller, and
wherein when the AC voltage drops, the power supply device performs control such that the second controller stops prior to the first controller.

2. The power supply device according to claim 1, further comprising:
a rectifier configured to rectify the AC voltage;
a first capacitor configured to be connected to the first transformer and to store and smooth the voltage rectified by the rectifier; and
a second capacitor configured to be connected to the second transformer and to store and smooth the voltage rectified by the rectifier,
wherein a backflow prevention unit configured to prevent electric energy of the first capacitor from flowing back to the second capacitor is connected between the first capacitor and the second capacitor.

3. The power supply device according to claim 1, wherein a stoppage voltage of the first controller is set to be lower than a stoppage voltage of the second controller, and when the AC voltage is stopped, the second controller stops prior to the first controller in accordance with the voltage generated by the voltage generator.

4. The power supply device according to claim 1,
wherein the auxiliary winding includes a first auxiliary winding and a second auxiliary winding, the number of windings of the second auxiliary winding being smaller than the number of windings of the first auxiliary winding, and
wherein the first auxiliary winding is connected to the first controller, and the second auxiliary winding is connected to the second controller.

5. An image forming apparatus that forms an image on a recording material, the image forming apparatus comprising:
an image forming unit; and
a power supply device configured to supply electric power to the image forming apparatus,
wherein the power supply device includes
a first switching power source configured to include a first transformer to which a voltage obtained by rectifying and smoothing an input AC voltage is supplied and to output a first DC voltage by switching the first transformer,
a first controller configured to control a switching operation of the first switching power source,
a second switching power source configured to include a second transformer to which a voltage obtained by rectifying and smoothing the AC voltage is input and to output a second DC voltage by switching the second transformer,
a second controller configured to control a switching operation of the second switching power source, and
a primary winding of the first transformer,
an auxiliary winding which is wound in the same winding direction as the primary winding, and
a voltage generator configured to be connected to the auxiliary winding and to generate a power supply voltage for driving the first controller and the second controller,
wherein the voltage generator generates the power supply voltage such that a power supply voltage supplied to the second controller is lower than a power supply voltage supplied to the first controller, and
wherein when the AC voltage drops, the power supply device performs control such that the second controller stops prior to the first controller.

6. The image forming apparatus according to claim 5, further comprising:
a rectifier configured to rectify the AC voltage;
a first capacitor configured to be connected to the first transformer and to store and smooth the voltage rectified by the rectifier; and
a second capacitor configured to be connected to the second transformer and to store and smooth the voltage rectified by the rectifier,
wherein a backflow prevention unit configured to prevent electric energy of the first capacitor from flowing back to the second capacitor is connected between the first capacitor and the second capacitor.

7. The image forming apparatus according to claim 5, wherein a stoppage voltage of the first controller is set to be lower than a stoppage voltage of the second controller, and when the AC voltage is stopped, the second controller stops prior to the first controller in accordance with the voltage generated by the voltage generator.

8. The image forming apparatus according to claim 5,
wherein the auxiliary winding includes a first auxiliary winding and a second auxiliary winding, the number of windings of the second auxiliary winding being smaller than the number of windings of the first auxiliary winding, and
wherein the first auxiliary winding is connected to the first controller, and the second auxiliary winding is connected to the second controller.

9. The image forming apparatus according to claim 5, further comprising:
a controller configured to control an operation of the image forming unit,
wherein the first switching power source of the power supply device supplies electric power to the controller.

10. The image forming apparatus according to claim 5, further comprising:
a driving unit configured to drive the image forming unit,
wherein the second switching power source of the power supply device supplies electric power to the driving unit.

* * * * *